(12) United States Patent
Virginas et al.

(10) Patent No.: US 10,021,662 B2
(45) Date of Patent: Jul. 10, 2018

(54) BASE STATION TIME SYNCHRONIZATION IN A WIRELESS NETWORK

(71) Applicant: British Telecommunications Public Limited Company, London (GB)

(72) Inventors: Botond Virginas, London (GB); David Rohlfing, London (GB); Phillip Bull, London (GB); Stephen Cassidy, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 15/550,688

(22) PCT Filed: Jan. 26, 2016

(86) PCT No.: PCT/EP2016/051562
§ 371 (c)(1),
(2) Date: Aug. 11, 2017

(87) PCT Pub. No.: WO2016/128212
PCT Pub. Date: Aug. 18, 2016

(65) Prior Publication Data
US 2018/0041980 A1 Feb. 8, 2018

(30) Foreign Application Priority Data
Feb. 13, 2015 (EP) .................................... 15275033

(51) Int. Cl.
*H04W 56/00* (2009.01)
*H04J 3/06* (2006.01)
*H04B 1/7073* (2011.01)

(52) U.S. Cl.
CPC ....... *H04W 56/0015* (2013.01); *H04J 3/0638* (2013.01); *H04W 56/0065* (2013.01); *H04B 1/7073* (2013.01)

(58) Field of Classification Search
CPC .......... H04W 56/001; H04W 56/0015; H04W 56/002; H04W 56/005; H04W 92/10;
(Continued)

(56) References Cited

U.S. PATENT DOCUMENTS 6,014,376 A 1/2000 Abreu et al.
2007/0249291 A1* 10/2007 Nanda ............... H04W 36/0083
455/73

(Continued)

FOREIGN PATENT DOCUMENTS

FR 2972322 A1 9/2012
WO WO 98/09390 3/1998

OTHER PUBLICATIONS

International Search Report for corresponding International Application No. PCT/EP2016/051562 dated Apr. 28, 2016; 4 pages.
(Continued)

*Primary Examiner* — Mohamed Kamara
(74) *Attorney, Agent, or Firm* — Amy M. Salmela; Patterson Thuente Pedersen, P.A.

(57) ABSTRACT

The operation of base stations in a wireless network whose areas of coverage do not overlap are synchronized by taking timing values from mobile units that travel from one area of coverage to another. A base station receiving a timing value from a mobile unit entering its area of coverage adapts its timing value and that of any mobile units in its coverage area, including the newly-arrived mobile unit, to a become a value intermediate between its existing timing value and that indicated by the mobile unit. The use of an intermediate value instability in the system that might result from an inability of the base stations to communicate directly with each other in real time.

9 Claims, 5 Drawing Sheets

(58) Field of Classification Search
CPC ..... H04W 92/20; H04W 36/00; H04W 36/10; H04W 36/18; H04W 36/22; H04W 36/26; H04W 36/28; H04W 36/36
See application file for complete search history.

(56) References Cited

U.S. PATENT DOCUMENTS

| | | | |
|---|---|---|---|
| 2010/0054237 | A1 | 3/2010 | Han et al. |
| 2012/0236977 | A1 | 9/2012 | Zou et al. |
| 2014/0169247 | A1* | 6/2014 | Jafarian ............ H04W 52/0216 370/311 |
| 2015/0043398 | A1* | 2/2015 | Fwu ..................... H04L 5/14 370/280 |
| 2016/0192278 | A1* | 6/2016 | Ji ..................... H04W 48/16 370/329 |
| 2017/0324444 | A1 | 11/2017 | Zoualfaghari |
| 2017/0324503 | A1 | 11/2017 | Zoualfaghari |

OTHER PUBLICATIONS

Written Opinion of the International Searching Authority for corresponding International Application No. PCT/EP2016/051562 dated Apr. 28, 2016; 6 pages.
International Preliminary Report on Patentability for corresponding International Application No. PCT/EP2016/051562 dated Jun. 26, 2017; 10 pages.
Abdalla et al, "Cluster-based multihop synchronization scheme for femotcell network," IIUM Engineering Journal (2012) vol. 13, No. 2; p. 161-172.
Amin et al., "Network listening based synchronization techniques for femtocell systems," 2011 IEEE $22^{nd}$ International Symposium on Personal, Indoor and Mobile Radio Communications (PIMRC) Sep. 11-14, 2011; 5 pages.
Mehrpouyan et al., "A new distributed approach for achieving clock synchronization in heterogeneous networks," 2011 IEEE Global Telecommunications Conference (GLOBECOM 2011) Dec. 5-9, 2011; 5 pages.

* cited by examiner

BASE STATION TIME SYNCHRONIZATION IN A WIRELESS NETWORK

CROSS-REFERENCE TO RELATED APPLICATIONS

The present application is a National Phase entry of PCT Application No. PCT/EP2016/051562, filed on 26 Jan. 2016, which claims priority to EP Patent Application No. 15275033.7, filed on 13 Feb. 2015, which are hereby fully incorporated herein by reference.

TECHNICAL FIELD

The present disclosure relates to a method of operating a mobile communications network, and in particular a method of providing synchronization data in a mobile communications network.

BACKGROUND

FIG. 1 shows a schematic depiction of a known mobile communications network 100. The network comprises a plurality of base stations 200 which define macrocells 210 within the network. Mobile terminals 400 within the macrocells 210 can communicate via the base stations 200. The base stations 200 will have backhaul connections (not shown) to allow for connections to the internet and other communications networks. The mobile communications network 100 further comprises one or more wireless access points 300 which define smaller cells 310 known variously as microcells, picocells and femtocells. The distinction between macrocells, microcells, and picocells is primarily one of scale, but femtocells typically have different backhaul arrangements to the other types.

Most base stations are installed, managed, and controlled by the network operator which also provides a dedicated transmission path back to the core network, controls the channels used by each base station to minimize interference between them, and maintains a "neighbor" list of other cells to which a handover is likely to be made. However, typical femtocells are installed, and powered, by an end user or business with less active remote management by the network operator, and are semi-autonomous, sensing from their immediate environment the best frequency and radio parameters to use. Backhaul connection is usually made through a public network, typically a DSL (digital subscriber loop) connection through the Internet.

For present purposes the backhaul arrangements are not significant, and the term "small cell" will be used to embrace any cell smaller than a macrocell.

It will be understood that in practice the edge of the area of coverage ("cell") 210, 310 of each base station is not a clearly defined boundary, but signal quality and strength decline with distance from the base station, further attenuated by buildings, foliage etc. For most purposes, however, the cell can be considered as delineated by a boundary defined by a particular value for signal quality. Cells overlap at locations where signal quality from more than one base station exceeds that value.

The wireless access points 300 transmit their signals at lower power levels and thus the small cells 310 cover a significantly smaller geographical area than the macrocells 210. A small cell can be used to provide network coverage in an area which macrocells do not cover and for which it is not economic to use a macrocell to cover that area. Alternatively a small cell can be deployed within a macrocell to provide greater network capacity such that mobile terminals in range of such a small cell can communicate via the small cell, the macrocell or the small cell and the macrocell simultaneously. The wireless access points 300 will also have backhaul connections (not shown) to allow for connections to the internet and other communications networks. The base stations and wireless access points preferably transmit and receive signals conforming to the LTE (Long Term Evolution) standard but it will be understood that other data standards could be used.

The wireless access points used to provide the small cells may be located within areas in which significant numbers of users are expected, for example shopping centers, railway stations, etc. Alternatively, LTE functionality could be incorporated into devices such as the applicant company's "Home Hub" product, which incorporates the functions of xDSL modem, router and WiFi access point. In such a case, an LTE mobile terminal would be able to connect to the device using its wireless access point function and the data would be routed via the DSL link to a core network and then onwards to its destination. For such a wireless access point, the LTE will have a power output of approximately 27 dBm which is likely to mean that the small cell will have a usable range of approximately 30 m radius. As discussed above, such very small cells using DSL as a backhaul rather than a dedicated fixed network, are often referred to as "femtocells". Unless the context requires otherwise, the term "small cell" in this specification embraces such femtocells.

LTE requires frequency synchronization among the access points, and the degree of accuracy depends upon the size of the cell—the effective area of coverage of the access point. Some modes of LTE operation also need timing phase synchronization, which means that all the access points need to be closely aligned in absolute time with respect to one another. FDD (Frequency Division Duplex) requires accurate frequency synchronization between small cells (between 100 and 250 parts per billion depending upon base-station class).

The use of TDD (Time Division Duplex) spectrum necessitates synchronization of base-stations in terms of timing phase because the transmit-receive switching of all the base-stations in the network needs to take place simultaneously in order to avoid intra-network interference.

When TDD is used in small cells that are deployed in houses, for example as part of a Home Hub femtocell, a major problem is that timing phase information cannot be passed down DSL links with sufficient accuracy. The cells need to be synchronization with one another to avoid problems. A known method of synchronization adjacent cells is for the cells to receive transmission from other cells and to co-ordinate their transmit-receive switching instants in time. However, such techniques are not effective when the first cell cannot receive signals from the second cell (and vice versa).

Such synchronization can be obtained, for example, by receiving a GPS (Global Positioning System) signal transmitted by a satellite, or by receiving a signal that is transmitted by a ground-based broadcasting station and that contains a reference time or frequency. However, when one or more base stations are located inside a building, receiving such synchronization signals is difficult, such that the synchronization is prevented or at least altered. Moreover, the base stations of a single-frequency network (SFN) are generally interconnected via a smaller-scale "backbone", such as an ADSL (asymmetric digital subscriber line) connection, whose synchronization is not as precise as the synchronization required for SFN operation.

Failure to achieve synchronization can result in interference between the transmissions of the various base stations. LTE-TDD needs phase synchronization to within about 3 microseconds across any group of access points with overlapping coverage. Whether FDD or TDD, some advanced LTE features also need accurate phase synchronization, for example the LTE-A feature CoMP (Co-operative Multipoint) is a kind of network MIMO that needs +/−0.5 microsecond timing phase accuracy across the group.

Synchronization is also required to ensure a successful handover of a mobile terminal from the coverage of one base station to that of another.

One method of achieving time phase synchronization would be to equip every cell with a very accurate clock, but this would be prohibitively expensive. Another is to monitor other networks, such as GPS or some other broadcast clock signals, but this can be unreliable when inside buildings, where line-of-sight to the transmitter of the broadcast signal may not be available, as a path length extended by as little as 150 meters by multipath effects (such as reflection of neighboring buildings) would delay the time signal by more than the required +/−0.5 microsecond timing phase accuracy.

A further option is to provide both frequency and time phase information over the backhaul network, and there are solutions for this, such as NTP, RFC1588v2 or NTR, usually used along with SynchE. Whereas frequency synchronization can be cheaply provided using NTP, and this is standard practice for 3G small cells, it is very much more costly to provide time phase information over the backhaul if there is a segment of the path that uses xDSL technology. This presents a significant difficulty for femtocells within houses, since xDSL is used in the majority of broadband installations.

One known approach to this problem of timing phase synchronization, is to arrange for small cells to monitor each other off-air by means of the receivers fitted to them. They can demodulate one another's transmissions and run an algorithm within themselves, to align the time phase with each other. However, it is common for small cells to not be located within range of each other's transmissions. In the arrangement shown in FIG. 1 this can be resolved by using mobile units 400 located in an area 500 within range of two or more base stations 200, 210, 300 to relay the synchronization data. However, this is not always possible.

FIG. 2 shows a schematic depiction of such a situation, showing part of a mobile communications network with a first wireless access point 300a and second wireless access point 300b. The first wireless access point 300a defines a first small cell which has an associated first coverage area 310a. Similarly, the second wireless access point 300b defines a second small cell which has an associated second coverage area 310b. It can be seen from FIG. 2 that the first wireless access point 300a is outside the second coverage area 310b and that the second wireless access point 300b is outside the first coverage area 310a. Moreover, unlike in FIG. 1, there is no overlap area 500 which is part of both the first coverage area 310a and the second coverage area 310b.

Referring to FIG. 1, assume that a first wireless access point 200 is already synchronized, a mobile terminal 400 within its range of coverage 210 will become synchronized with the first wireless access point 200. If the mobile terminal 400 is also within range of a second wireless access point 300 which cannot receive synchronization data from the network or another access point, the second wireless access point 300 can detect the transmissions from mobile terminal 400 and thus receive the necessary synchronization data from the mobile terminal. Thus, it can be seen that the mobile terminal 400 acts as a bridge, with the synchronization data being transmitted from the first wireless access point 200 to the second access point 300, via the mobile terminal 400. French Patent specification FR2972322 describes a system operating in this way.

However, a, common problem with indoor small cells is that there is little or no overlap between them, or between a small cell and the macrocell coverage available outside the building. Small cell coverage is usually optimized to cover the individual rooms of a building and any coverage of the threshold or entrance hallway, or the area immediately outside the entrance, is likely to be incidental and fortuitous. Even where the threshold of the building does represent an overlap between small cell and macrocell coverage, mobile units are only within the overlap zone very briefly, for example when entering or leaving a building.

This is, of course, precisely the time that synchronization is required to be already in operation, as the mobile unit hands over between the outdoor macrocell and the indoor small cell.

The reference discussed above attempts to solve this by weighting times taken by base stations from mobile units according to a number of measures relevant to the reliability of the time value received from the mobile unit. However, as base stations time bases may drift relative to each other, the system is not stable and requires constant updating.

SUMMARY

According to a first aspect of the present disclosure there is provided a method of operating a communications network, the network comprising: a plurality of base stations; the base stations having respective areas of coverage, and one or more mobile terminals; each base station being operable to generate and broadcast time value signals, and each defining a respective reference time for operation of the respective base station; the method comprising:

i) at a first base station, transmitting a time value signal to a mobile terminal when the mobile terminal is in communication with the first base station, such that the mobile terminal can be synchronized to the reference time associated with the first base station;

ii) at a second base station, receiving a time value signal from said mobile terminal defining the first reference time when the mobile terminal subsequently establishes communication with the second base station and is no longer in communication with the first base station, and iii) at the second base station, generating a third reference time derived from the first reference time defined in the time value signal received from the mobile terminal and the second reference time currently used for operation of the second base station, and resynchronizing operation of the second base station to the third reference time, wherein the third reference time differs from the first reference time by a value TSF which is a predetermined fraction, between zero and 1 inclusive, of the difference between the first and second reference times, and wherein one or more source base stations in the network determine their second reference time from a source independent of the time value signals received from the mobile units, and have the value TSF set to zero, so that mobile units become synchronized with the independent source when paired with the source base stations.

Stability in the network is maintained by the provision of at least one reference base station which is synchronized to an independent source. Such a reference base station does not re-synchronize in response to mobile units that enter its area of coverage, but otherwise performs in the same way as the other base stations in the network.

The present disclosure therefore allows a base station to retrieve timing data from mobile units handing over to it, that data having been stored in the mobile unit using updates from its previous serving base station. A base station can therefore become synchronized to the reference time even if its area of coverage is completely isolated from any other, or when there is currently no mobile unit in any area of overlapping coverage with other base stations. Thus the wireless base stations' coverage areas do not need to overlap for synchronization, and the additional devices (e.g. mobile handsets) can bridge between them.

Embodiments of the disclosure are of particular applicability when the first and second areas do not overlap, or when any overlap between the first and second areas is never, or only rarely and/or briefly occupied by any mobile units, and in particular when the second area is isolated from any areas covered by other base stations. The predetermined fraction may be selected according to factors such as the time that has elapsed since a previous re-synchronize, the number of such re-synchronization updates that have taken place in a predetermined interval, or the identity of the first base station from which the mobile terminal received the first synchronization signal.

In one arrangement the second base station transmits the third synchronization signal to any mobile units currently in communication with it, such that the mobile units can adapt their timings to remain synchronized to the second base station.

According to a second aspect of the present disclosure there is provided a base station comprising: a processor, volatile data storage, non-volatile data storage, and one or more wireless interfaces, the base station being configured, in use, to operate as the second base station in a method as described above. The base station may serve a small cell in a communications network. Such a base station may in turn perform the method in the role of the first base station, in order to relay synchronization signals to further base stations.

According to a third aspect of the present invention there is provided a tangible data carrier for use in a computing device, the data carrier comprising computer executable code which, in use, performs a method as described above.

According to a fourth aspect of the present disclosure there is provided a terminal for use with a mobile communications network, the terminal being configured, in use, to: a) receive synchronization data from a first base station when the terminal is located within an area covered by the first base station; b) store the synchronization data, c) detect that the mobile unit has moved to an area covered by a second base station, and transmit the stored synchronization data to the second base station. The mobile unit can then receive synchronization data from the second base station.

BRIEF DESCRIPTION OF THE DRAWINGS

Embodiments of the present disclosure will now be described, by way of example only, with reference to the accompanying drawings in which.

DETAILED DESCRIPTION

Figure 1:
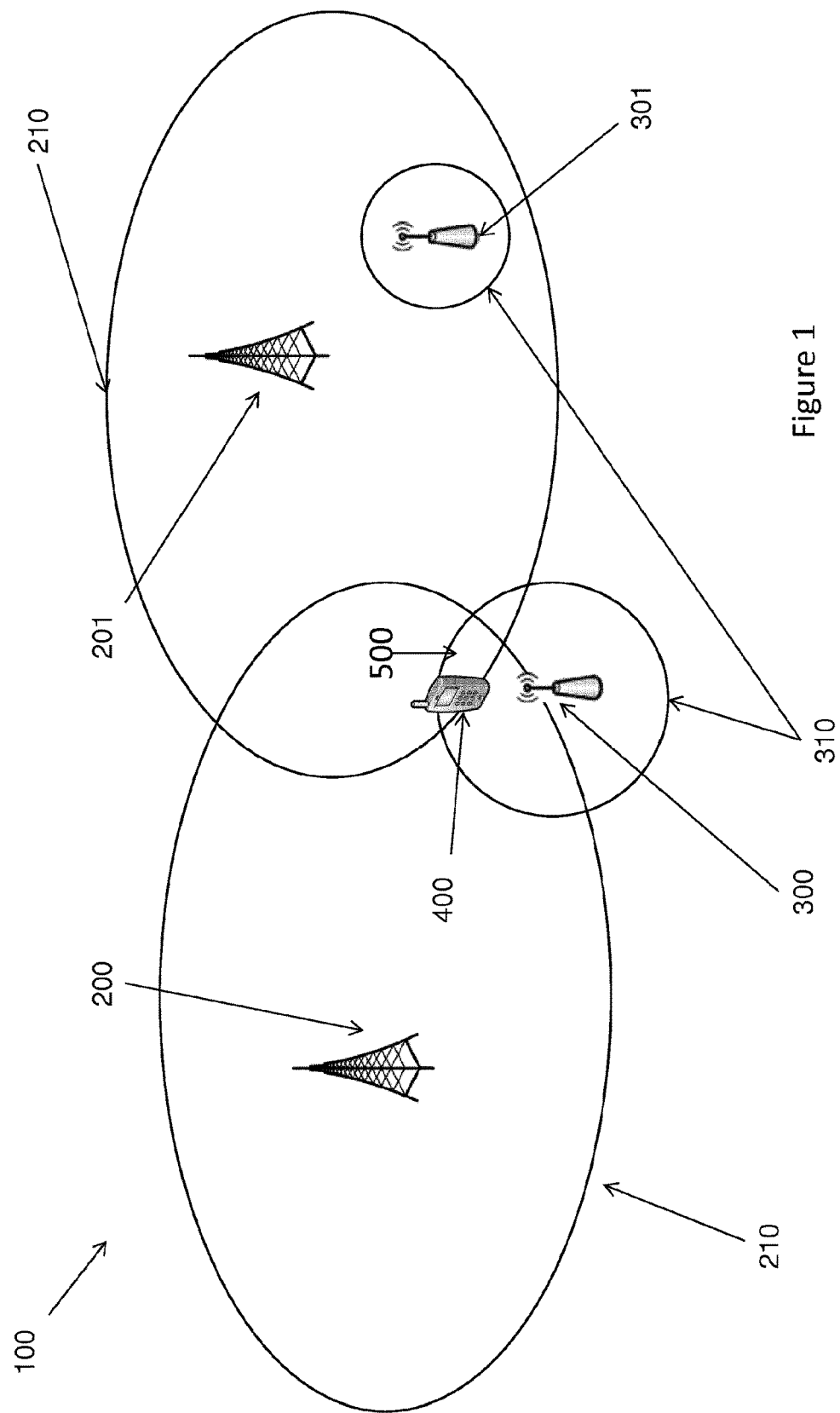
FIG. 1 shows a schematic depiction of a known mobile communications network.

As shown in FIG. 1, a wireless network 100 is composed of a number of handsets 400 and a number of base stations 200, 201, 300, 301. Both numbers can be continually evolving as existing base stations/handsets are relocated or new base stations/handsets join or leave the network). The handsets are mobile, but the base stations, which have fixed-line backhaul connections, are generally in fixed locations, at least whilst in use, although femtocells can be moved fairly readily. At any one time, a handset 400 is paired with at most one base station 200, but a base station may be paired with several handsets. The pairings are formed based on signal strength. Once the signal strength drops below a threshold level, a handover process is initiated. The currently-paired base station 200 is in charge for the handovers and the handset measures signal strength from other base stations 201, 300 and communicates this information with the paired base station. When the signal drops below the threshold, the paired base station performs the handover to the best candidate 300 as communicated by the handset.

Each base station maintains a time value at any one moment. Time is important because of interference if the base stations' clocks are different, leading to impaired performance. This time value is transmitted by each base station in a synchronization signal, and is used by each mobile unit to synchronize its operation with that of the base station to which they are currently paired.

Typically, macrocell base stations such as 200, 201 are in permanent locations with secure backhaul connections. As their positions are known precisely GPS time signals can also be used to improve synchronization. Femtocells such as 300, 301 are more portable, and may be connected to simpler DSL links with unknown or unreliable latency, making synchronization less reliable. In prior art systems such as that shown in FIG. 1, the time values of the various base stations can be synchronized by each base station monitoring the time values of neighboring stations—for example macrocell base station 210 can be detected by femtocell base station 301, so that they may exchange data and allow the femtocell to be synchronized to the macrocell. As discussed already, it is also known for a mobile handset 400 located in an overlap area 500 between coverage zones 210, 310 (that is to say, within range of both the respective base stations 200, 300) to relay synchronization information from one to the other.

Figure 2:
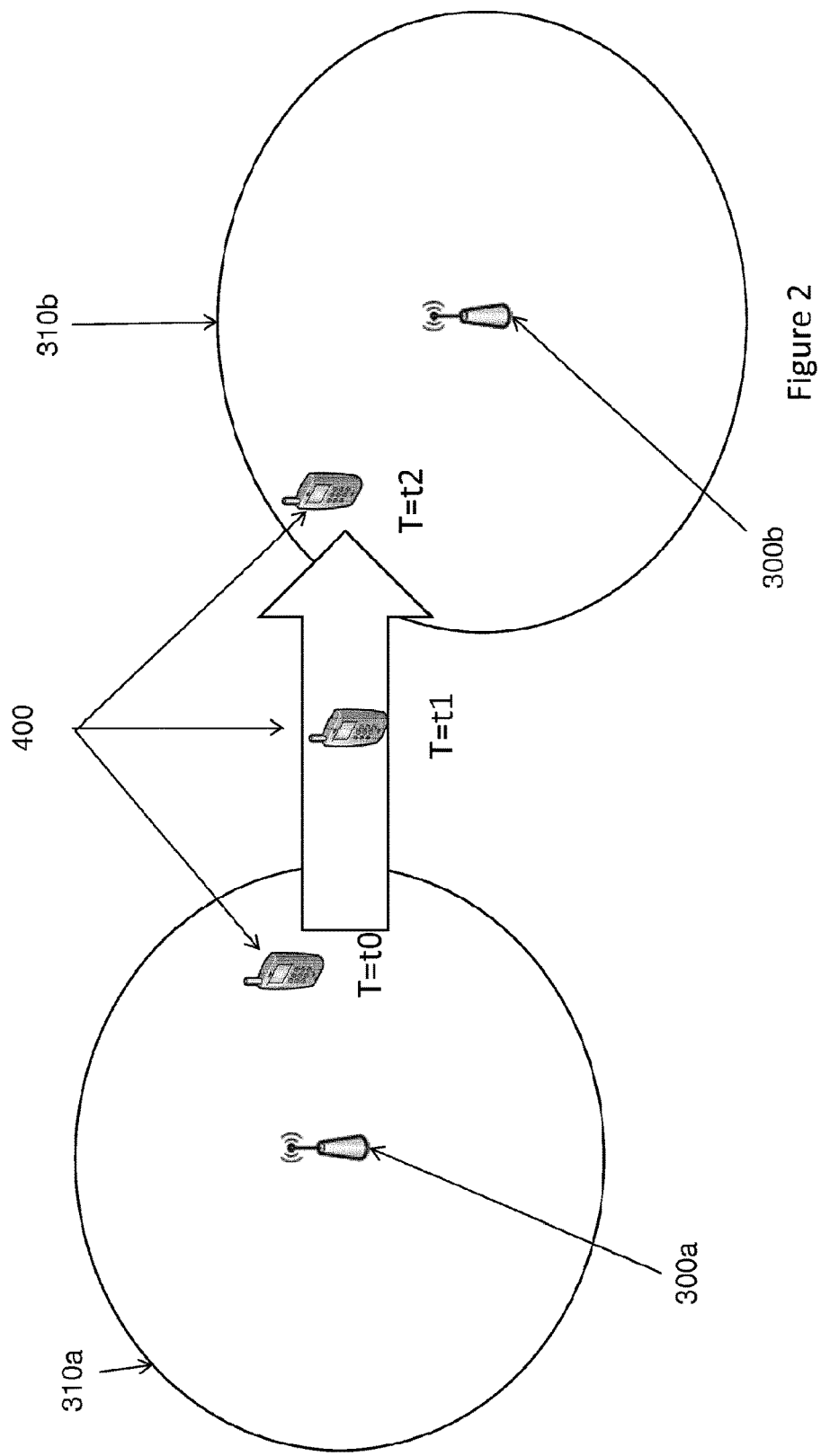
FIG. 2 shows a schematic depiction of a part of a mobile communications network.

The present disclosure is concerned with a different situation, depicted in FIG. 2, in which a mobile handset 400 is not in contact with both base stations 300a, 300b simultaneously, or only for such a short period that it cannot be used to relay synchronization data between them. In other words, it moves out of the first area 310a before it enters the area 310b. The present disclosure allows the synchronization data to be maintained despite the time interval between losing contact with the first base station and making contact with the second. In this circumstance it is also not possible for synchronization data to be exchanged—the data transfer is strictly one-way. This is significant, because for many handovers the handset will be moving from a base station which is less accurately synchronized with the core network to one which is more accurately synchronized.

To achieve this, the mobile terminal retains the synchronization data it received from the first base station after it loses contact with it, until it is updated by the second base station. However, before it is updated by the second base station, it forwards, to the second base station, the synchronization data it received from the first base station.

Secondly, as the second base station cannot exchange data directly with the first one, there is a possibility that simply adapting to the synchronization signal transmitted by the mobile handset will take it further from synchronization with the core network, rather than closer. For this reason the second base station modifies its synchronization data according to several recent updates. This may be a simple mean value of those values provided in a predetermined number of previous handovers, or the handovers in a predetermined preceding time period, or it may be weighted towards the most recent, or according to flag values indicating how many handovers the individual handsets have undergone since they were connected to a one of a set of predetermined reference base stations.

Figure 3:
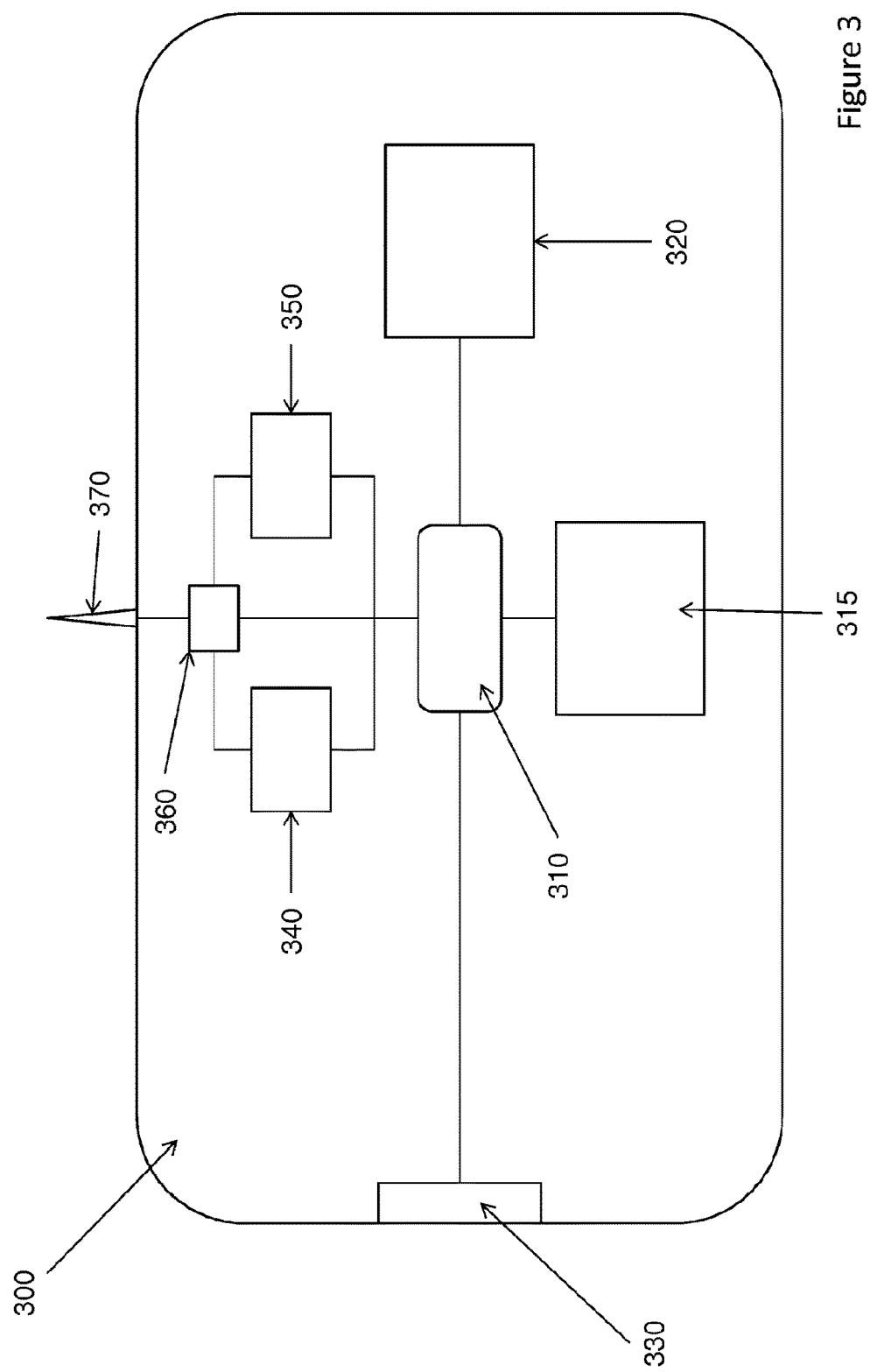
FIG. 3 shows a schematic depiction of a wireless access point 300 according to the present invention.

FIG. 3 shows a schematic depiction of a wireless access point 300 according to the present invention which comprises a central processing unit (CPU) 310, volatile data storage means 315, non-volatile data storage means 320, communications network interface 330, LTE transmitter circuitry 340, LTE receiver circuitry 350, transmitter-receiver switch 360 and antenna 370. In operation, the CPU will execute code stored within the non-volatile data storage means and will hold data in the volatile data storage means. The wireless access point is able to communicate to further communications networks via the communications network interface. For example, the communications network interface may be an interface to an ADSL or VDSL line. The wireless access point can communicate with one or more mobile terminals via the antenna such that a mobile terminal can communicate to and from the further communications networks (it will be understood that the antenna of the wireless access point may comprise a smart antenna comprising a plurality of antenna elements). In addition to the LTE transmitter and circuitry the wireless access point may comprise WiFi circuitry and antenna, as well as other wireless interfaces.

Data which is to be sent to a mobile terminal will be received at the wireless access point at the communications network interface. The CPU will undertake the necessary processing for the data to be transmitted as an LTE signal and will instruct the transmitter-receiver switch to reserve the antenna for a time period. The LTE data will be sent to the LTE transmitter circuitry and then, during the reserved time period, the data is transmitted via the antenna. Similarly, if the wireless access point is to receive data from a mobile terminal then the antenna will be reserved for one or more time periods by the CPU and the LTE signals will be received at the LTE receiver circuitry. The received LTE signals are then sent to the CPU such that the payload of the LTE signals can be extracted and then forwarded to its destination, via the communications network interface. Although the previous discussion has focused on the use of software executed by the CPU to perform the processing of the LTE packets it will be understood that this functionality may be provided by the provision of one or more chips which are able to perform that processing. Such an alternative does not affect the functioning of the present invention.

Figure 4:
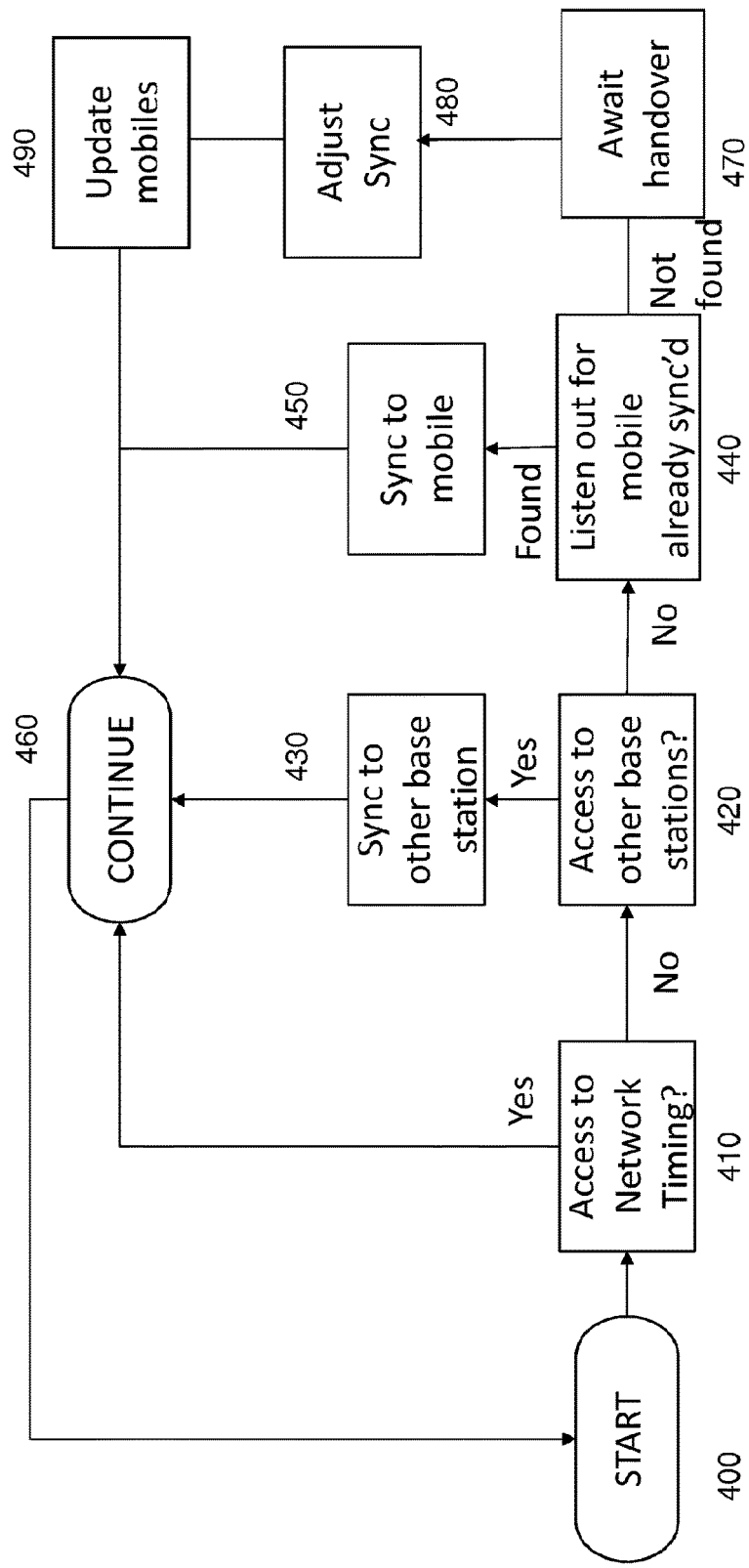
FIG. 4 shows a graphical depiction of a flowchart which describes the process by which a wireless access point can obtain synchronization data.

As has been discussed previously, it is vital in TDD LTE that each of the wireless access points are synchronized. FIG. 4 is a flowchart which describes the process by which a wireless access point can obtain synchronization data.

The process starts at 400 and at 410 the wireless access point attempts to synchronize by accessing network timing data. If this is successful then the process concludes at 460. In the case that the wireless access point is connected to the network via an xDSL network (as discussed above) then this will not be possible. In such a case, the wireless access point does not transmit any data packets and the process continues to 420. At 420 the wireless access point will listen for one or more transmit periods: if there are other transmitting wireless access points within range then it will be able to receive transmissions from those wireless access points and therefrom derive the necessary synchronization data. If such transmissions are received then the wireless access point will try and synchronize on the basis of the received data at 430. Once synchronization has been achieved then the process concludes at 460. If no wireless access point transmissions are received then the process will proceed to 440.

At 440, the wireless access point will listen for one or more further transmit periods for transmissions from one or mobile terminals. If that mobile terminal is synchronized, for example via a further wireless access point, the unsynchronized wireless access point may be able to synchronize on the basis of the signals received from the mobile terminal. If the wireless access point can receive a signal from one or more mobile terminals then the wireless access point will attempt to synchronize at 450. The wireless access point will determine if the mobile terminal has synchronized via a further wireless access point. The mobile terminal will only transmit if it is itself synchronized. If the AP in FIG. 4 can receive transmissions from one or more mobile terminals, it must mean that the mobile terminal (or mobile terminals) are time phase synchronized to another AP (or other APs).

If the mobile terminal is already synchronized then the wireless access point will align its transmit-receive timing phase with that of the mobile terminal or terminals. If there are no signals received from mobile terminals then the process ends at 460, because it can assume that synchronization is not needed in order to manage interference. It is expected that the synchronization attempt would need to be repeated on a periodic basis, for example every few hours. It could also be instructed by the network to make a synchronization attempt, if one or more mobile terminals in the area reported poor signal quality.

It will be apparent to those skilled in the field of mobile technology that 410-430 are known. If, in 440, the wireless access point receives signals from more than one mobile terminal then the synchronization carried out in 450 may be on the basis of the data derived from the mobile terminal which has the strongest signal. Alternatively, an averaging (or similar statistical) process can be used to give a more accurate time phase synchronization.

In the event that the base station cannot synchronize to a fixed terminal by direct timing signal from the fixed network (410) or another base station (420) or to a mobile unit that is currently synchronized to another base station (440), the base station is arranged to take a synchronization signal from a mobile terminal during a connection process (470) of that terminal to the base station. The mobile terminal may be handing over a live call, or may have been disconnected from the network for a period prior to the connection now being made. In response to synchronization data stored in the mobile handset, the base station adjusts its own synchronization data in a process which will be described in detail shortly (480) and uses this data to update the synchronization of all mobile units currently working to it, including the one that has made the handover (490). It is important to recognize that, in general, the base station will not simply synchronize to the mobile unit that is being handed over to. This would lead to an unstable system, for example if one base station were unable to maintain synchronization between updates it would continuously pass on its maladjusted synchronization to any mobile units it pairs with, which would in turn disrupt the synchronization of the next base station each mobile handset connects to. Instead, the synchronization data received from the mobile unit is used to update a weighted average of the synchronization data from recent updates. In this way, as mobile units move from one bases station to another and back again, the base stations will gradually converge on synchronization, and the effect of any maverick base station can be damped out.

Figure 5:
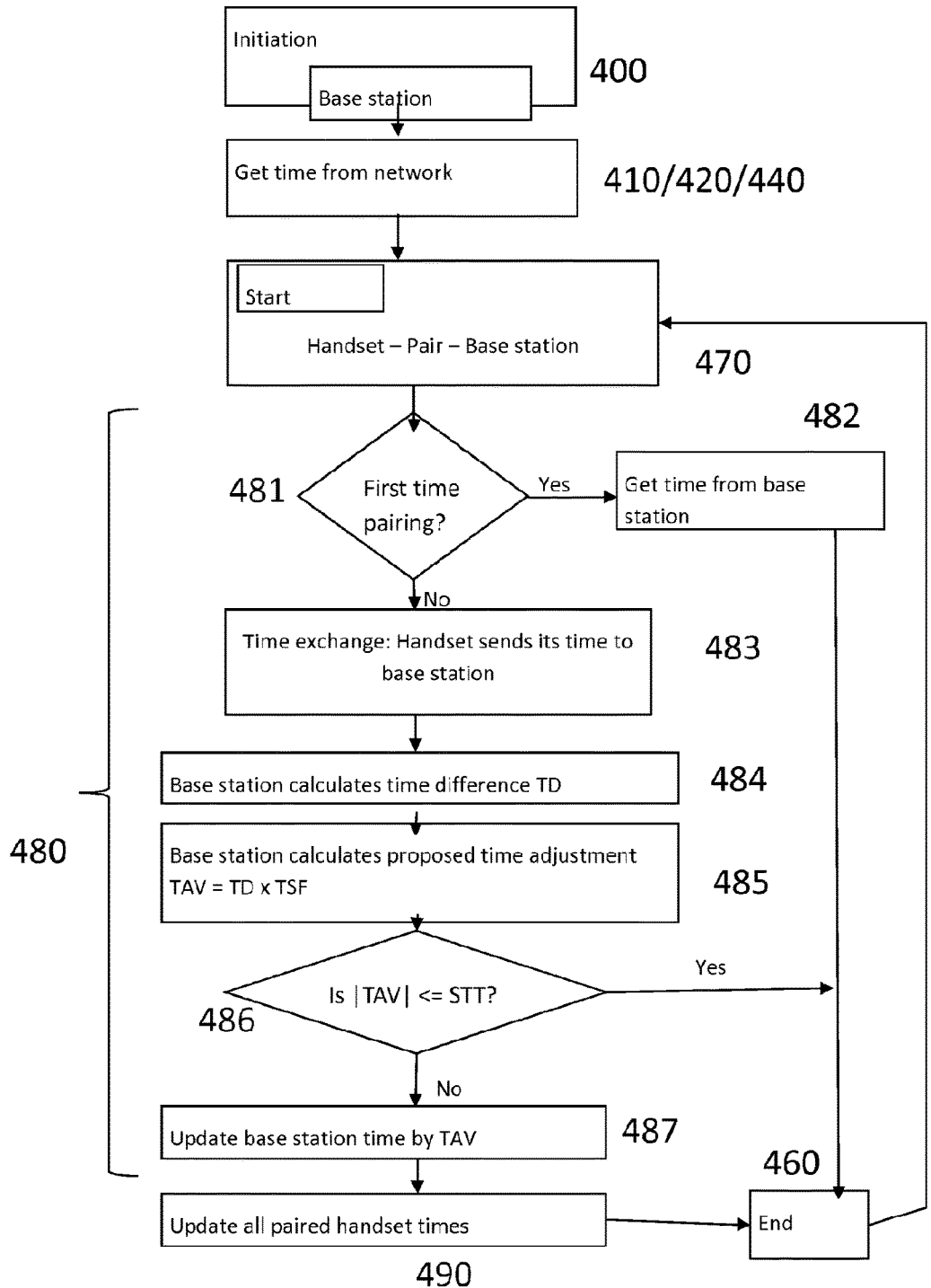
FIG. 5 shows a graphical depiction of a flowchart which describes certain aspects of the process depicted in FIG. 4 in more detail.

FIG. 5 depicts 470, 480, and 490 in greater detail.

The base station has two values pre-set. The actual values will depend on the requirements of the user. These values are:

system timing tolerance (STT): this value is set according to the requirements of the technology, and in particular the required accuracy of synchronization, and time setting fraction (TSF) (a value typically less than 1): smaller values lead to a longer time until the system fully stabilizes, but the system will exhibit greater instant stability, lessening the need for additional handset process timers.

As shown in FIG. 5, each base station in the network initiates operation by obtaining a time value from the network, either directly (410) or indirectly through other base stations (420/430, 440/450). The accuracy of these estimates will vary according to network delay according to route, number of hops, differences in path length, etc. The present invention allows the base stations to revise these initial values to be more closely synchronized with each other.

When a handset is first paired with a base station (481) it adopts the time from the base station (482) as is conventional. Otherwise, if it already has a synchronization time stored, it transmits that time to the base station (483) The base station then calculates the time difference TD between its own clock and the time received from the new handset (484), and multiplies this value TD by the time setting fraction TSF to create a time adjustment value TAV (485). If this value TAV is less than or equal to the system timing tolerance STT (486), then the base station and mobile unit are already synchronized to within the permitted tolerance and the handover is complete. Otherwise, if the TAV is outside the setting tolerance STT, the base station adjusts its time by the time adjustment value TAV (487). It should be noted that TAV can take positive or negative values, and thus the timing may be advanced or retarded.

It will be noted that the new time will fall somewhere between the existing base station time and that imported by the handset, the weighting of the two values being determined by the time setting faction TSF. The actual value of the time setting fraction is selected according to how rapidly the base station is required to respond to time values imported by visiting mobile stations, bearing in mind that a high degree of responsiveness can lead to instability, and in particular that it is not in general possible to determine whether the base station or the handset has the more accurate timing signal. A further factor in selecting a value for TSF is the expected rate at which handovers are expected to occur at that base station. The value of the time setting fraction TSF can also be dynamically varied according to the number of handsets (NHP) currently paired. I.e. Effective time setting fraction ETSF=TSF/NHP, so that each handset has influence in inverse proportion to the number of handsets in the local system.

One or more base stations are defined to be reference clocks, and the TSF for such a base station is set at zero. This results in it never changing its time in response to mobile units pairing with it, and eventually all other base stations will have a time matching it to within the system timing tolerance. With reference to FIG. 5, a reference station can be considered either as having a time setting fraction equal to zero, or as omitting 484-487.

Ideally only one reference base station would be required, but in networks where handovers occur only rarely it may be desirable to have two or more, to increase the rate at which timing is propagated through the network. The selection of the reference station can be arbitrary, but it can be advantageous for the reference station to have a reliable independent source to which it may synchronize, or to have a very stable independent oscillator. It is also advantageous for a base station which handles a lot of handover traffic to be selected as the reference, as this improves the rate at which its reference time can be propagated through the network.

Once the base station has re-set its time (487), all handsets currently paired to the base station, including the one whose handover caused the time adjustment, are synchronized to the revised base station time (490). The new base station time is therefore adopted by all currently paired handsets. The handsets may need to keep separate process timers running independently of system time if required by other currently running applications, until such time as the process in question has completed and they can come into line with the new time.

The process can run indefinitely, and eventually the migration of handsets between base stations will cause all base stations that see other handsets to achieve times that are within the system timing tolerance STT.

The embodiment may operate with conventional handsets in the system as well as handsets carrying the time updating capability. The conventional handsets will simply be updated to the current base station time. The base station may be arranged to only update timing in response to recognizing an authentication token transmitted by a handset before it can contribute to the time adjustment mechanism, thus reducing the opportunity for disruption by rogue handsets. Handsets that do not have this token can only read a base station time. Such a token may be specific to the handset, or it may be generated by an authenticated base station, so that the handset can verify that the base station it took its time from is itself authentic. Both the handset and the source base station may be verified separately, using two verification tokens.

In order to avoid abrupt and large changes in synchronization, which may disrupt any sessions currently operating between the base station and handsets already paired with it, a predetermined maximum value MTAV may be set for the time adjustment value TAV, for example, defined as a multiple of STT.

A base station is more likely to run slow than to run fast, as some factors affecting timing, notably latency, can only result in delay. Therefore if there is a discrepancy between the time a handset has taken from its previous paired base station and the base station it is now attempting to pair with, the earlier (faster) time is more likely to be correct—or at least likely to be more correct. In one variant embodiment, the base station therefore only responds to positive values of TAV: thus a timing adjustment can only speed up a base station and not slow it down.

Two worked examples of the process will now be described. For these examples the value of TSF (time setting fraction) is set at 10% and the value of STT (system timing tolerance) is set at 1 millisecond.

In the first example, a handset 400 is switched on for the first time, and introduces itself to a base station 300a within range (470), so that pairing takes place. The handset will then adopt the time of this base station (482).

The handset then leaves the first base station 300a and later joins a second base station 300b. Pairing begins (470) and times are compared (483, 484). In this example, a difference TD=1 second is observed between the times. A time adjustment value TAV=TD×TSF which, for the example values set above equals 0.1 seconds (100 milliseconds). This value is greater than the system tolerance of 1 ms, so the base station time is adjusted by the TAV, and all handset currently paired to the base station adopt this new time.

It will be noted that, as a result of this process, the difference in timing between the two base stations has been reduced from 1 second to 0.9 seconds (900 milliseconds). Should the same or other handsets then hand over between the base stations, in either direction, that difference will be reduced further each (by a further 10% if both base stations are using the same value of TSF, i.e. to 810 ms, then to 729 milliseconds, etc., After about twenty handovers the difference will be reduced to 100 ms, after a further twenty handovers to 10 ms, and after a further twenty handovers to less than the tolerance value of 1 millisecond). This assumes of course that neither base station has been further updated by a handover of another mobile from a third base station in the interim, and that the internal clock rates of both base stations are the same.

In the second example, the difference TD between the time imported by the mobile unit and that currently running on the second base station 300b is 5 milliseconds. This value, multiplied by the time setting fraction TSF 10% gives a time adjustment value TAV of 0.5 milliseconds. As this is less than the system tolerance of 1 millisecond, the system will not respond and no further change is made to either the base station 2 time or any handset time paired with this base station 200.

As embodiments of the present disclosure may be implemented on software within a base station (or mobile terminal), it may be possible to upgrade a conventional device to one which can perform a method according to the present disclosure. Computer code may be deployed to such a device via download, for example via the internet, or on some physical media, for example, DVD, CD-ROM, USB memory stick, etc., for which the router has an appropriate media reader. Similarly, a conventional tablet computer or smartphone may be adapted to operate in accordance with the present disclosure by the downloading and installation of one or more apps.

The invention claimed is:

1. A method of operating a communications network, the network comprising a plurality of base stations, the base stations having respective areas of coverage, and one or more mobile terminals, each base station being operable to generate and broadcast time value signals, and each defining a respective reference time for operation of the respective base station, the method comprising:

i) receiving, by each base station, time value signals from mobile terminals when establishing communication with the mobile terminals, the received time value signals being reference times previously received from base stations with which the mobile terminals have previously been in communication;

ii) generating, by each base station, derived reference times derived from the received time value signals and reference times currently used for operation of the base station;

iii) resynchronizing, by each base station, operation of the base station to the derived reference times, wherein the derived reference times differ from the received time value signals by a value time setting fraction (TSF) which is a predetermined fraction, between zero and 1 inclusive, of the difference between the received time value signals and the current reference times, and replacing the current reference time by the derived reference time; and iv) transmitting, by each base station, the derived reference time to mobile terminals in communication with the respective base stations, such that the mobile terminals can be synchronized to the derived reference times of currently communicating base stations, wherein one or more source base stations in the network have the value TSF set to zero and determine current reference times from a source independent of the time value signals received from the mobile terminals, so that the derived reference time is equal to the current reference time and mobile terminals become synchronized with the independent source when paired with the source base stations.

2. A method according to claim 1, wherein a difference between the derived reference times and the current reference times is subject to a predetermined maximum.

3. A method according to claim 1, wherein the predetermined fraction is selected according to time that has elapsed since a previous re-synchronization.

4. A method according to claim 1, wherein the predetermined fraction is selected according to a number of re-synchronization updates that have taken place in a predetermined interval.

5. A method according to claim 1, wherein the predetermined fraction is selected according to a number of mobile terminals currently paired with a respective one of the plurality of base stations.

6. A method according to claim 1, wherein the predetermined fraction is selected according to a code generated by a respective one of the plurality of base stations from which the mobile terminal received a first synchronization signal.

7. A method according to claim 1, in which mobile terminals in communication with a respective one of the plurality of base stations receive the time value signal broadcast by the respective one of the plurality of base stations and adapt their timings to the derived reference time of that base station.

8. A base station comprising:
a processor, volatile data storage, non-volatile data storage, and one or more wireless interfaces, the base station being configured, in use, to operate as one of the plurality of base stations in the method according to claim 1.

9. A non-transitory tangible data carrier for use in a computing device, the data carrier comprising computer executable code which, in use, performs the method according to claim 1.

* * * * *